United States Patent
Taylor et al.

(10) Patent No.: US 10,549,186 B2
(45) Date of Patent: Feb. 4, 2020

(54) MULTIPOINT SLAM CAPTURE

(71) Applicant: Sony Interactive Entertainment Inc., Tokyo (JP)

(72) Inventors: Michael Taylor, San Mateo, CA (US); Glenn Black, San Mateo, CA (US); Javier Fernandez Rico, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 16 days.

(21) Appl. No.: 16/019,140

(22) Filed: Jun. 26, 2018

(65) Prior Publication Data

US 2019/0388781 A1 Dec. 26, 2019

(51) Int. Cl.
*A63F 13/00* (2014.01)
*A63F 13/26* (2014.01)
(Continued)

(52) U.S. Cl.
CPC ............ *A63F 13/26* (2014.09); *A63F 13/213* (2014.09); *A63F 13/35* (2014.09); *A63F 13/5378* (2014.09); *G06T 7/579* (2017.01); *G06T 19/006* (2013.01); *A63F 2300/8082* (2013.01); *G06T 2207/10028* (2013.01); *G06T 2219/024* (2013.01)

(58) Field of Classification Search
None
See application file for complete search history.

(56) References Cited

U.S. PATENT DOCUMENTS 5,228,069 A 7/1993 Arenson et al.
6,291,816 B1 9/2001 Liu
(Continued)

FOREIGN PATENT DOCUMENTS

EP 2225699 A1 9/2010
EP 2730939 A2 5/2014
EP 2339532 B1 4/2015

OTHER PUBLICATIONS

Shintani et al., "3D Depth Map", related U.S. Appl. No. 15/590,497, Applicant's response to Non-Final Office Action filed Aug. 7, 2019. (201605686.02-1168-881).

(Continued)

*Primary Examiner* — Paul A D'Agostino
(74) *Attorney, Agent, or Firm* — John L. Rogitz

(57) ABSTRACT

"Feature points" in "point clouds" that are visible to multiple respective cameras (i.e., aspects of objects imaged by the cameras) are reported via wired and/or wireless communication paths to a compositing processor which can determine whether a particular feature point "moved" a certain amount relative to another image. In this way, the compositing processor can determine, e.g., using triangulation and recognition of common features, how much movement occurred and where any particular camera was positioned when a latter image from that camera is captured. Thus, "overlap" of feature points in multiple images is used so that the system can close the loop to generate a SLAM map. The compositing processor, which may be implemented by a server or other device, generates the SLAM map by merging feature point data from multiple imaging devices.

30 Claims, 9 Drawing Sheets

(51) Int. Cl.
  *G06T 7/579* (2017.01)
  *G06T 19/00* (2011.01)
  *A63F 13/213* (2014.01)
  *A63F 13/35* (2014.01)
  *A63F 13/5378* (2014.01)

(56) References Cited

U.S. PATENT DOCUMENTS

| | | |
|---|---|---|
| 6,420,698 B1 | 7/2002 | Dimsdale |
| 6,442,465 B2 | 8/2002 | Breed et al. |
| 6,664,501 B1 | 12/2003 | Troitski |
| 6,970,183 B1 | 11/2005 | Monroe |
| 7,184,088 B1 | 2/2007 | Ball |
| 7,262,854 B2 | 8/2007 | Imura |
| 7,752,483 B1 | 7/2010 | Muresan et al. |
| 7,791,009 B2 | 9/2010 | Johnston et al. |
| 8,730,309 B2 | 5/2014 | Wilson et al. |
| 8,780,113 B1 | 7/2014 | Ciurea et al. |
| 8,803,950 B2 | 8/2014 | Ren et al. |
| 8,824,827 B2 | 9/2014 | Quan et al. |
| 8,830,555 B2 | 9/2014 | Aksamit et al. |
| 9,031,356 B2 | 5/2015 | Kunkel et al. |
| 9,098,908 B2 | 8/2015 | Kirk et al. |
| 9,214,492 B2 | 12/2015 | Tempel et al. |
| 9,235,928 B2 | 1/2016 | Medioni et al. |
| 9,262,691 B2 | 2/2016 | Kang et al. |
| 9,275,302 B1 | 3/2016 | Yan et al. |
| 9,286,694 B2 | 3/2016 | Kim et al. |
| 9,319,139 B2 | 4/2016 | Effenberger et al. |
| 9,405,008 B2 | 8/2016 | Raskar et al. |
| 9,426,450 B1 | 8/2016 | Zhang et al. |
| 9,435,891 B2 | 9/2016 | Oggier |
| 9,483,835 B2 | 11/2016 | Liang et al. |
| 9,542,749 B2 | 1/2017 | Freedman et al. |
| 9,557,166 B2 | 1/2017 | Thuries et al. |
| 9,618,613 B2 | 4/2017 | Murakami et al. |
| 9,760,837 B1 | 9/2017 | Nowozin et al. |
| 9,806,813 B2 | 10/2017 | Liu et al. |
| 9,858,673 B2 | 1/2018 | Ciurea et al. |
| 9,860,618 B2 | 1/2018 | Liu et al. |
| 9,995,578 B2 | 6/2018 | Ge et al. |
| 10,142,612 B2 | 11/2018 | Ge et al. |
| 2004/0141170 A1 | 7/2004 | Jamieson et al. |
| 2004/0141753 A1 | 7/2004 | Euw et al. |
| 2004/0208272 A1 | 10/2004 | Moursund et al. |
| 2005/0031166 A1 | 2/2005 | Fujimura et al. |
| 2005/0207755 A1 | 9/2005 | Rabbat et al. |
| 2005/0226214 A1 | 10/2005 | Keslassy et al. |
| 2006/0221241 A1 | 10/2006 | Okumichi et al. |
| 2006/0239558 A1 | 10/2006 | Rafii et al. |
| 2007/0024614 A1 | 2/2007 | Tam et al. |
| 2007/0279415 A1 | 12/2007 | Sullivan et al. |
| 2008/0152247 A1 | 6/2008 | Oh et al. |
| 2009/0080885 A1 | 3/2009 | Mehrotra et al. |
| 2009/0190853 A1 | 7/2009 | Noh |
| 2010/0302365 A1 | 12/2010 | Finocchio et al. |
| 2011/0025843 A1 | 2/2011 | Oggier et al. |
| 2011/0188773 A1 | 8/2011 | Wei et al. |
| 2011/0243570 A1 | 10/2011 | Kim et al. |
| 2012/0032833 A1 | 2/2012 | Milligan et al. |
| 2012/0044476 A1 | 2/2012 | Earhart et al. |
| 2012/0056982 A1 | 3/2012 | Katz et al. |
| 2012/0069009 A1 | 3/2012 | Shimoyama et al. |
| 2012/0168605 A1 | 7/2012 | Milanovic et al. |
| 2012/0182394 A1 | 7/2012 | Bae et al. |
| 2012/0237085 A1* | 9/2012 | Meier .................. G06K 9/3216 |
| | | 382/103 |
| 2012/0248514 A1 | 10/2012 | Korekado et al. |
| 2012/0249544 A1 | 10/2012 | Maciocci et al. |
| 2012/0293615 A1 | 11/2012 | Chen et al. |
| 2012/0306876 A1 | 12/2012 | Shotton et al. |
| 2013/0051516 A1 | 2/2013 | Yang et al. |
| 2013/0129224 A1 | 5/2013 | Katz et al. |
| 2013/0195083 A1 | 8/2013 | Kim et al. |
| 2013/0207970 A1 | 8/2013 | Shpunt et al. |
| 2013/0278604 A1 | 10/2013 | Georgis et al. |
| 2013/0293684 A1 | 11/2013 | Becker et al. |
| 2013/0329012 A1 | 12/2013 | Bartos et al. |
| 2014/0058367 A1 | 2/2014 | Dantus |
| 2014/0079288 A1 | 3/2014 | Lee et al. |
| 2014/0092221 A1 | 4/2014 | Nagai |
| 2014/0168424 A1 | 6/2014 | Attar et al. |
| 2014/0198977 A1 | 7/2014 | Narasimha et al. |
| 2014/0226984 A1 | 8/2014 | Roberts et al. |
| 2014/0240467 A1 | 8/2014 | Petyushko et al. |
| 2014/0253679 A1 | 9/2014 | Guigues et al. |
| 2014/0253691 A1 | 9/2014 | Holz |
| 2014/0267234 A1* | 9/2014 | Hook .................... H04W 4/029 |
| | | 345/419 |
| 2014/0293993 A1 | 10/2014 | Ryhorchuk |
| 2014/0323148 A1 | 10/2014 | Schmalstieg et al. |
| 2014/0333728 A1 | 11/2014 | Navab et al. |
| 2014/0355901 A1 | 12/2014 | Tezaur |
| 2014/0375851 A1 | 12/2014 | Lee et al. |
| 2014/0376768 A1 | 12/2014 | Troy et al. |
| 2015/0002636 A1 | 1/2015 | Brown |
| 2015/0022643 A1 | 1/2015 | Stetson et al. |
| 2015/0024336 A1 | 1/2015 | Blassnig et al. |
| 2015/0036926 A1 | 2/2015 | Choi et al. |
| 2015/0070489 A1 | 3/2015 | Hudman et al. |
| 2015/0130903 A1 | 5/2015 | Thompson et al. |
| 2015/0130904 A1 | 5/2015 | Bae et al. |
| 2015/0171968 A1 | 6/2015 | Featherston et al. |
| 2015/0248765 A1 | 9/2015 | Criminisi et al. |
| 2015/0254811 A1 | 9/2015 | Sahu et al. |
| 2015/0294686 A1 | 10/2015 | Autioniemi |
| 2015/0309663 A1 | 10/2015 | Seo et al. |
| 2015/0339471 A1 | 11/2015 | Bennett et al. |
| 2015/0371393 A1 | 12/2015 | Ramachandra et al. |
| 2015/0373322 A1 | 12/2015 | Goma et al. |
| 2015/0378023 A1 | 12/2015 | Royo et al. |
| 2016/0012633 A1 | 1/2016 | Wei et al. |
| 2016/0097851 A1 | 4/2016 | Zhang et al. |
| 2016/0098847 A1 | 4/2016 | Crnokrak |
| 2016/0099777 A1 | 4/2016 | Liu et al. |
| 2016/0124089 A1 | 5/2016 | Meinherz et al. |
| 2016/0133230 A1* | 5/2016 | Daniels ................. G06T 19/006 |
| | | 345/633 |
| 2016/0173869 A1 | 6/2016 | Wang et al. |
| 2016/0191759 A1 | 6/2016 | Somanath et al. |
| 2016/0239725 A1 | 8/2016 | Liu et al. |
| 2016/0283774 A1 | 9/2016 | Buchanan et al. |
| 2016/0291160 A1 | 10/2016 | Zweigle et al. |
| 2016/0328828 A1 | 11/2016 | Zhang et al. |
| 2016/0344967 A1 | 11/2016 | Barnes et al. |
| 2017/0061701 A1 | 3/2017 | Mittal et al. |
| 2017/0188017 A1 | 6/2017 | Hall |
| 2017/0201738 A1 | 7/2017 | Lacaze et al. |
| 2017/0213356 A1 | 7/2017 | Park |
| 2017/0264880 A1 | 9/2017 | Zolotov |
| 2017/0277180 A1 | 9/2017 | Baer et al. |
| 2017/0332750 A1 | 11/2017 | Gharabegian |
| 2017/0372527 A1 | 12/2017 | Murali et al. |
| 2017/0374342 A1* | 12/2017 | Zhao .................. G01B 11/2518 |
| 2018/0033357 A1 | 2/2018 | Li et al. |
| 2018/0034579 A1 | 2/2018 | Liu et al. |
| 2018/0053284 A1 | 2/2018 | Rodriguez et al. |
| 2018/0100928 A1 | 4/2018 | Keilaf et al. |
| 2018/0124371 A1 | 5/2018 | Kamal et al. |
| 2018/0139431 A1* | 5/2018 | Simek .................. H04N 13/232 |
| 2018/0173323 A1* | 6/2018 | Harvey ................. G06T 19/006 |
| 2018/0173990 A1 | 6/2018 | Shintani et al. |
| 2018/0176483 A1* | 6/2018 | Knorr .................. G06T 19/006 |
| 2018/0190014 A1 | 7/2018 | Yarborough et al. |
| 2018/0234617 A1 | 8/2018 | Przyborski |
| 2018/0249151 A1* | 8/2018 | Freeman ............... G16H 20/30 |
| 2019/0236361 A1* | 8/2019 | Fish .................... G06K 9/00671 |

OTHER PUBLICATIONS

Shintani et al., "3D Depth Map", related U.S. Appl. No. 15/590,497, Non-Final Office Action dated Jul. 29, 2019. (201605686.02-1168-881).

(56) References Cited

OTHER PUBLICATIONS

Shintani et al., "Generating 3D Depth Map Using Parallax", related U.S. Appl. No. 15/798,914, Applicant's response to Non-Final Office Action filed Jul. 12, 2019. (201705777.01-1168-916).
Shintani et al., "Generating 3D Depth Map Using Parallax", related U.S. Appl. No. 15/798,914, Non-Final Office Action dated Jul. 9, 2019. (201705777.01-1168-916).
International Search Report and Written Opinion dated Sep. 13, 2019 from the counterpart PCT application PCT/US19/35589.
Daniel Freedman, Eyal Krupka, Yoni Smolin, Ido Leichter, Mirko Schmidt, "SRA: Fast Removal of General Multipath for ToF Sensors", Microsoft Research, Microsoft Corporation, Mar. 24, 2014.
Derek Chan, Hylke Buisman, Christian Theobalt, Sebastian Thrun, "A Noise-Aware Filter for Real-Time Depth Upsampling", Oct. 5, 2008, retrieved from https://hal.inria.fr/inria-00326784.
Ho, Edmond S.L. et al., "Improving Posture Classification Accuracy for Depth Sensor-Based Human Activity Monitoring in Smart Environments", Jul. 2016, retrieved from http://www.sciencedirect.com/science/article/pii/S1077314216000138.
Nathan Silberman, Rob Fergus, "Indoor Scene Segmentation using a Structured Light Sensor", Dept. of Computer Science, Nov. 6, 2011, Courant Institute, New York University, pp. 601-608.
Quang H. Nguyen, Minh N. Do, Sanjay J. Patel, "Depth image-based rendering from multiple cameras with 3D propagation algorithm", May 27, 2009.
Riegler et al., "A Deep Primal-Dual Network for Guided Depth Super-Resolution", Institute for Computer Graphics and Vision, Graz University of TechnologyAustria, Jul. 28, 2016.
Schuon et al., "High-Quality Scanning Using Time-of-Flight Depth Superresolution", Stanford University, 2008.
Shuran Song, Jianxiong Xiao, "Sliding Shapes for 3D Object Detection in Depth Images", Abstract, Sep. 2014.
Yo-Sung Ho, Yun-Suk Kang, "Multi-View Depth Generation using Multi-Depth Camera System", Gwangju Institute of Science and Technology, Jan. 4, 2016.
Peter Shintani, Jose Omar Gonzalez Hernandez, William Clay, Pablo Antonio Espinosa, Fred Ansfield, Bibhudendu Mohapatra, Keith Resch, Morio Usami, "Using Pattern Recognition to Reduce Noise in a 3D Map", file history of related U.S. Appl. No. 15/383,392, filed Dec. 19, 2016. (201605638.01-1168-871).
Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", file history of related U.S. Appl. No. 15/370,197, filed Dec. 6, 2016. (201605635.01-1168-872).
Peter Shintani, Jose Omar Gonzalez Hernandez, William Clay, Pablo Antonio Espinosa, Fred Ansfield, Bibhudendu Mohapatra, Keith Resch, Morio Usami, "Color Noise Reduction in 3D Depth Map", file history of related U.S. Appl. No. 15/371,433, filed Dec. 7, 2016. (201605637.01-1168-874).
Peter Shintani, Jose Omar Gonzalez Hernandez, William Clay, Pablo Antonio Espinosa, Fred Ansfield, Bibhudendu Mohapatra, Keith Resch, Morio Usami, "Using Multiple Cameras to Stitch a Consolidated 3D Depth Map", file history of related U.S. Appl. No. 15/383,683, filed Dec. 19, 2016. (201605639.01-1168-875).
Peter Shintani, Jose Omar Gonzalez Hernandez, William Clay, Pablo Antonio Espinosa, Fred Ansfield, Bibhudendu Mohapatra, Keith Resch, Morio Usami, "Using Micro Mirrors to Improve the Field of View of a 3D Depth Map", file history of related U.S. Appl. No. 15/432,674, filed Feb. 14, 2017. (201605652.01-1168-876).
Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", file history of related U.S. Appl. No. 15/477,369, filed Apr. 3, 2017. (201605644.01-1168-880).
Peter Shintani, Morio Usami, Kissei Matsumoto, Kazuyuki Shikama, Bibhudendu Mohapatra, Keith Resch, "3D Depth Map", file history of related U.S. Appl. No. 15/590,497, filed May 9, 2017. (201605686.02-1168-881).

Peter Shintani, Morio Usami, Kazuyuki Shikama, Keith Resch, "Generating 3D Depth Map Using Parallax", file history of related U.S. Appl. No. 15/798,914, filed Oct. 31, 2017. (201705777.01-1168-916).
Peter Shintani, Jose Omar Gonzalez Hernandez, William Clay, Pablo Antonio Espinosa, Fred Ansfield, Bibhudendu Mohapatra, Keith Resch, Morio Usami, "Using Multiple Cameras to Stitch a consolidated 3D Depth Map", related U.S. Appl. No. 15/383,683, Non-Final Office Action dated Jul. 12, 2018. (201605639.01-1168-875).
Peter Shintani, Jose Omar Gonzalez Hernandez, William Clay, Pablo Antonio Espinosa, Fred Ansfield, Bibhudendu Mohapatra, Keith Resch, Morio Usami, "Using Multiple Cameras to Stitch a Consolidated 3D Depth Map", related U.S. Appl. No. 15/383,683, Applicant's response to Non-Final Office Action filed Jul. 16, 2018. (201605639.01-1168-875).
Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Final Office Action dated Aug. 23, 2018. (201605644.01-1168-880).
Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Applicant's response to Final Office Action filed Sep. 4, 2018. (201605644.01-1168-880).
Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Final Office Action dated Sep. 10, 2018. (201605635.01-1168-872).
Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Applicant's response to Final Office Action filed Sep. 12, 2018. (201605635.01-1168-872).
Peter Shintani, Jose Omar Gonzalez Hernandez, William Clay, Pablo Antonio Espinosa, Fred Ansfield, Bibhudendu Mohapatra, Keith Resch, Morio Usami, "Using Pattern Recognition to Reduce Noise in a 3D Map", related U.S. Appl. No. 15/383,392, Final Office Action dated Sep. 12, 2018. (201605638.01-1168-871).
Peter Shintani, Jose Omar Gonzalez Hernandez, William Clay, Pablo Antonio Espinosa, Fred Ansfield, Bibhudendu Mohapatra, Keith Resch, Morio Usami, "Using Pattern Recognition to Reduce Noise in a 3D Map", related U.S. Appl. No. 15/383,392, Applicant's response to Final Office Action filed Sep. 14, 2018. (201605638.01-1168-871).
Peter Shintani, Morio Usami, Kissei Matsumoto, Kazuyuki Shikama, Bibhudendu Mohapatra, Keith Resch, "3D Depth Map", related U.S. Appl. No. 15/590,497, Final Office Action dated Nov. 19, 2018. (201605686.02-1168-881).
Peter Shintani, Morio Usami, Kissei Matsumoto, Kazuyuki Shikama, Bibhudendu Mohapatra, Keith Resch, "3D Depth Map", related U.S. Appl. No. 15/590,497, Applicant's response to Final Office Action filed Dec. 6, 2018. (201605686.02-1168-881).
Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Non-Final Office Action dated Dec. 27, 2018. (201605644.01-1168-880).
Peter Shintani, Jose Omar Gonzalez Hernandez, William Clay, Pablo Antonio Espinosa, Fred Ansfield, Bibhudendu Mohapatra, Keith Resch, Morio Usami, "Using Micro Mirrors to Improve the Field of View of a 3D Depth Map", related U.S. Appl. No. 15/432,674, Non-Final Office Action dated Feb. 14, 2019. (201605652.01-1168-876).
Peter Shintani, Jose Omar Gonzalez Hernandez, William Clay, Pablo Antonio Espinosa, Fred Ansfield, Bibhudendu Mohapatra, Keith Resch, Morio Usami, "Using Micro Mirrors to Improve the Field of View of a 3D Depth Map", related U.S. Appl. No.

(56) References Cited

OTHER PUBLICATIONS

15/432,674, Applicant's response to Non-Final Office Action filed Feb. 20, 2019. (201605652.01-1168-876).
Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Final Office Action dated Feb. 11, 2019. (201605644.01-1168-880).
Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Applicant's response to Final Office Action filed Feb. 21, 2019. (201605644.01-1168-880).
Peter Shintani, Jose Omar Gonzalez Hernandez, William Clay, Pablo Antonio Espinosa, Fred Ansfield, Bibhudendu Mohapatra, Keith Resch, Morio Usami, "Color Noise Reduction in 3D Depth Map", related U.S. Appl. No. 15/371,433, Final Office Action dated Apr. 2, 2019. (201605637.01-1168-874).
Peter Shintani, Jose Omar Gonzalez Hernandez, William Clay, Pablo Antonio Espinosa, Fred Ansfield, Bibhudendu Mohapatra, Keith Resch, Morio Usami, "Color Noise Reduction in 3D Depth Map", related U.S. Appl. No. 15/371,433, Applicant's response to Final Office Action filed Apr. 15, 2019. (201605637.01-1168-874).
Peter Shintani, Morio Usami, Kissei Matsumoto, Kazuyuki Shikama, Bibhudendu Mohapatra, Keith Resch, "3D Depth Map", related U.S. Appl. No. 15/590,497, Non-Final Office Action dated Mar. 25, 2019. (201605686.02-1168-881).
Peter Shintani, Morio Usami, Kissei Matsumoto, Kazuyuki Shikama, Bibhudendu Mohapatra, Keith Resch, "3D Depth Map", related U.S. Appl. No. 15/590,497, Applicant's response to Non-Final Office Action filed Apr. 2, 2019. (201605686.02-1168-881).
Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Non-Final Office Action dated Mar. 21, 2019. (201605635.01-1168-872).
Peter Shintani, Jose Omar Gonzalez Hernandez, William Clay, Pablo Antonio Espinosa, Fred Ansfield, Bibhudendu Mohapatra, Keith Resch, Morio Usami, "Optical Micromesh for Computerized Devices", related U.S. Appl. No. 15/370,197, Applicant's response to Non-Final Office Action filed Apr. 1, 2019. (201605635.01-1168-872).
He et al, "Iterative Transduction Learning for Automatic Image Segmentation and Matting with RGB-D Data", Elsevier, Mar. 2014.
Jang et al, "Depth Map Generation Using a Single Image Sensor with Phase Masks", Chang-Ang University, Seoul, South Korea, Jun. 2016.

Kim et al, "Multi-focusing and Depth Estimation Using a Color Shift Model-Based Computational Camera", IEEE Transactions on Image Processing, vol. 21, No. 9, Sep. 2012.
Li et al, "Brain-Inspired Framework for Fusion of Multiple Depth Cues", IEEE Transactions on Circuits and Systems for Video Technology, vol. 23, No. 7, Jul. 2013.
Roy et al, "Denoising 3D Models with Attributes Using Soft Thresholding", Bourgogne University, France, 2004.
Shintani et al, "Color Noise Reduction in 3D Depth Map", related U.S. Appl. No. 15/371,433, Non-Final Office Action dated Jun. 21, 2019. (201605637.01-1168-874).
Shintani et al, "Color Noise Reduction in 3D Depth Map", related U.S. Appl. No. 15/371,433, Non-Final Office Action response filed Jun. 28, 2019. (201605637.01-1168-874).
Shintani et al, "Using Micro Mirrors to Improve the Field of View of a 3D Depth Map", related U.S. Appl. No. 15/432,674, Final Office Action dated May 3, 2019. (201605652.01-1168-876).
Shintani et al, "Using Micro Mirrors to Improve the Field of View of a 3D Depth Map", related U.S. Appl. No. 15/432,674, Applicant's response to Final Office Action filed May 31, 2019. (201605652.01-1168-876).
Shintani et al, "Using Super Imposition to Render a 3D Depth Map", related U.S. Appl. No. 15/477,369, Applicant's Reply Brief filed May 29, 2019. (201605644.01-1168-880).
Shintani et al, "Using Super Imposition to Render a 3D Depth Map", related U.S. Appl. No. 15/477,369, Examiner's Answer dated May 13, 2019. (201605644.01-1168-880).
Jinbeum Jang, Sangwoo Park, Jieun Jo, Joonki Paik, "Depth map generation using a single image sensor with phase masks", Image Processing and Intelligent System Laboratory Graduate School of Advanced Imaging Science and Film, Chung-Ang University, Seoul, South Korea, Optical Society of America, 2016.
Peter Shintani, Jose Omar Gonzalez Hernandez, William Clay, Pablo Antonio Espinosa, Fred Ansfield, Bibhudendu Mohapatra, Keith Resch, Morio Usami, "Using Super Imposition to Render a 3D Depth Map", related U.S. Appl. No. 15/477,369, Applicant's response to Non-Final Office Action filed Jan. 4, 2019. (201605644.01-1168-880).
Peter Shintani, Jose Omar Gonzalez Hernandez, William Clay, Pablo Antonio Espinosa, Fred Ansfield, Bibhudendu Mohapatra, Keith Resch, Morio Usami, "Color Noise Reduction in 3D Depth Map", related U.S. Appl. No. 15/371,433, Non-Final Office Action dated Jan. 10, 2019. (201605637.01-1168-874).
Peter Shintani, Jose Omar Gonzalez Hernandez, William Clay, Pablo Antonio Espinosa, Fred Ansfield, Bibhudendu Mohapatra, Keith Resch, Morio Usami, "Color Noise Reduction in 3D Depth Map", related U.S. Appl. No. 15/371,433, Applicant's response to Non-Final Office Action filed Jan. 17, 2019. (201605637.01-1168-874).

* cited by examiner

P2P

BASE STATION

CLOUD

MULTIPOINT SLAM CAPTURE

FIELD

The present application relates to technically inventive, non-routine solutions that are necessarily rooted in computer technology and that produce concrete technical improvements.

BACKGROUND

Simultaneous localization and mapping (SLAM) maps can be useful to help autonomous robots navigate about a room or building, and to also help users navigate about a room or building when wearing an augmented reality (AR) headset. As understood herein, generating a SLAM map preferably should be done as inexpensively and unobtrusively as possible, to avoid detracting from an AR or virtual reality (VR) experience.

SUMMARY

"Feature points" in "point clouds" that are visible to multiple respective cameras (i.e., aspects of objects imaged by the cameras) are reported via wired and/or wireless communication paths to a compositing processor which can determine whether a particular feature point "moved" a certain amount relative to another image. In this way, the compositing processor can determine, e.g., using triangulation and recognition of common features, how much movement occurred and where any particular camera was positioned when a latter image from that camera is captured. Thus, "overlap" of feature points in multiple images is used so that the system can close the loop to generate a SLAM map. The compositing processor, which may be implemented by a server or other device, generates the SLAM map by merging feature point data from multiple imaging devices.

As envisioned herein, a storage device includes at least one computer medium that is not a transitory signal and that in turn includes instructions executable by at least one processor to receive, from a first device, at least first feature points in a point cloud, and to receive, from a second device, at least second feature points in a point cloud. The instructions are executable to generate a simultaneous localization and mapping (SLAM) map using the first and second feature points.

In examples, the instructions may be executable to exchange device identifying information with the second device.

In non-limiting implementations the first feature points include at least portions of an image of the second device. In example embodiments the instructions can be executable to receive from at least a third device third feature points and generate the SLAM map using the third feature points. In some implementations the instructions may be executable to determine a distance to a first feature point at least in part based on a size of the first feature point. If desired, some embodiments may include instructions that are executable to, responsive to determining that the SLAM map has a blind spot, alter presentation of a computer game on at least one of the first and second devices. The first and second devices may be implemented as computer game headsets.

In another aspect, an assembly includes at least first and second computer game headsets, each comprising at least one respective camera. The assembly includes a processor programmed with instructions to generate, using the respective camera of the first computer game headset, at least a first image of feature points in a point cloud, receive from at least the second computer game headset, at least a second image of feature points in a point cloud, and generate a SLAM map using the first and second images.

In another aspect, a method includes receiving, from a first device, at least first feature points in a point cloud, receiving, from a second device, at least second feature points in a point cloud, and generating a simultaneous localization and mapping (SLAM) map using the first and second feature points.

The details of the present application, both as to its structure and operation, can be best understood in reference to the accompanying drawings, in which like reference numerals refer to like parts, and in which:

DETAILED DESCRIPTION

Figure 1:
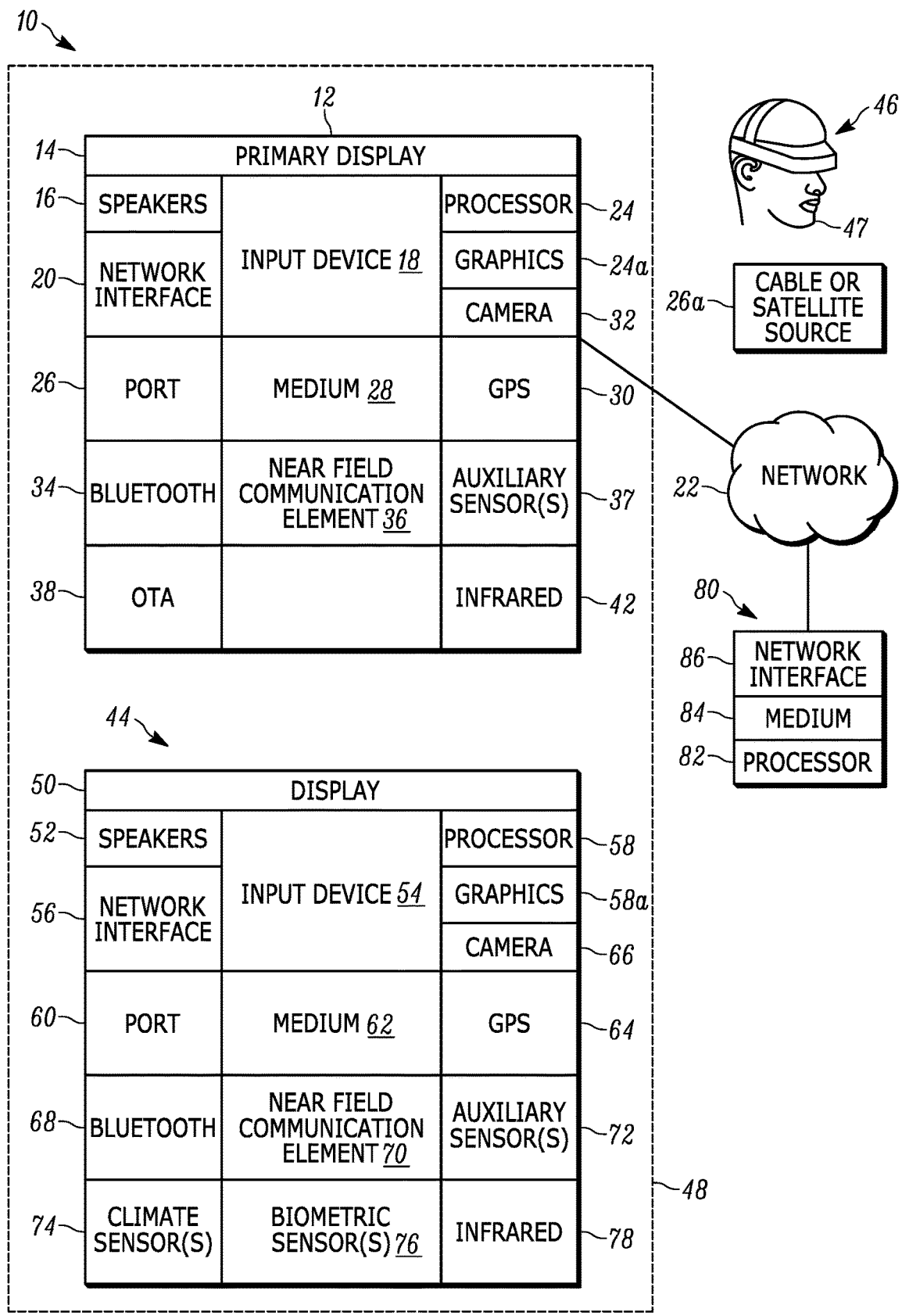
FIG. 1 is a block diagram of an example system consistent with present principles.

When multiple users interact with each other at close range, a simultaneous localization and mapping (SLAM) map can be useful both as input to video game software and as a tool to warn players when they may be about to bump into a real-world object or each other. For example, this might be useful in the context of computer game players interacting in an augmented reality (AR) or virtual reality (VR) emulated world. SLAM maps can also be constructed using camera input from the respective devices of multiple users interacting in the same space.

This disclosure relates generally to computer ecosystems including aspects of consumer electronics (CE) device networks such as but not limited to computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR)

headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 including. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below. The source 26a when implemented as a game console may include some or all of the components described below in relation to the CE device 44.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media. Also, in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid-state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid-state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm" and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 2:
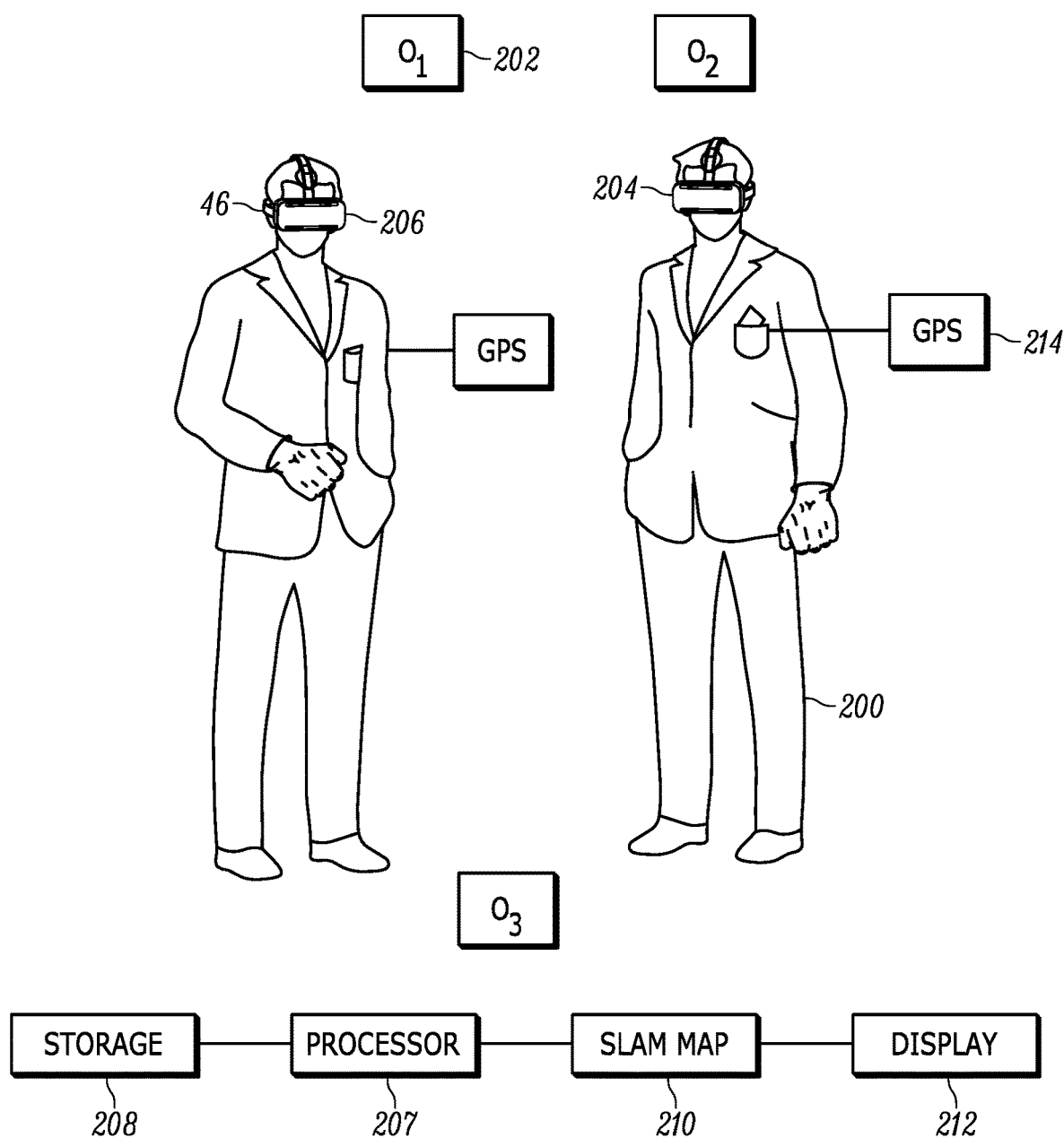
FIG. 2 is a block diagram of a specific system showing two computer game players with AR/VR headsets, it being understood that more than two players may be used.

FIG. 2 shows that two more computer game players 200 in a room in which one or more real world objects 202 such as furniture are disposed may each don a respective AR and/or VR headset 204, which may be implemented by, e.g., the headset 47 shown in FIG. 1 and implementing one or more of the appropriate components of the CE device 46 described above. Thus, each headset 204 may include a respective still or video camera 206 that can image space around the respective player 200, and that may be mounted on the headset in any appropriate orientation, such as facing forward, i.e., facing the same way the player faces when wearing the headset as intended.

The headsets 204 may also contain wired and/or wireless transceivers to send images from the respective cameras 206 and player/device identifications to one or more processors 207 accessing one or more computer storages 208 to generate one or more SLAM maps 210 consistent with principles herein. A SLAM map and associated information may be presented on respective displays 212 such as speakers and/or video displays on or in the respective headsets, or on the AVD 12 or other display device. The one or more processors 207 may be implemented in a variety of architectures, three of which are discussed below in references to FIGS. 11-13. If desired, each player and/or headset may be associated with a respective location device such as a global positioning satellite (GPS) receiver 214.

Figure 3:
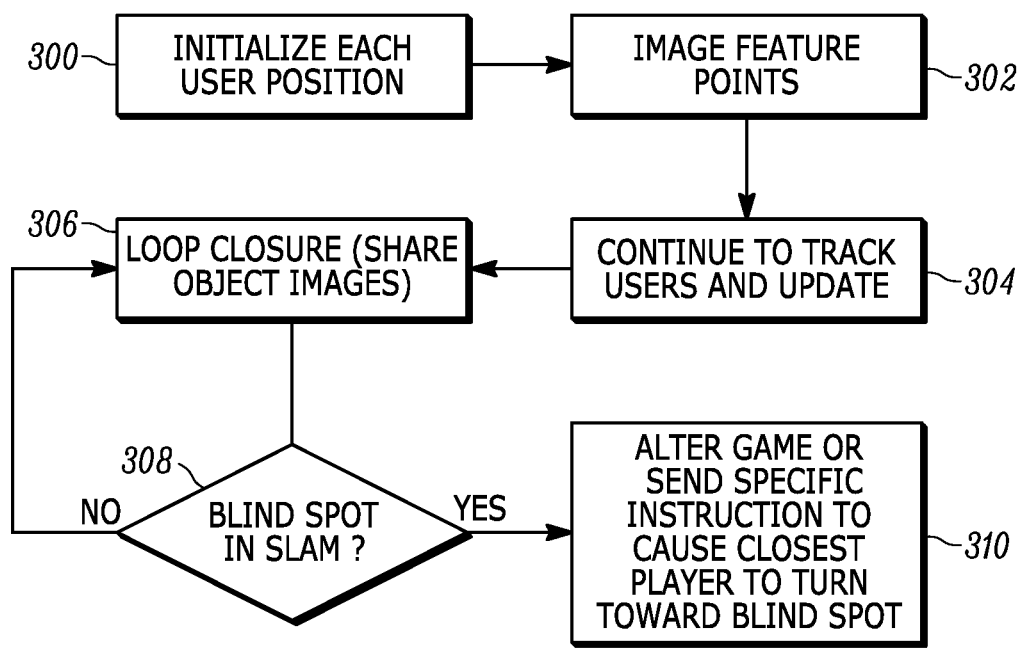
FIG. 3 is a flow chart of example logic consistent with present principles.

FIG. 3 illustrates overall logic consistent with present principles. Commencing at block 300, the location of each player is initialized, e.g., by recording their locations as indicated by the respective GPS receivers 214. Moving to block 302, each camera on each headset images feature points, which may include portions of objects and other players in its field of view, in effect extracting features and descriptors of the area. Block 304 indicates that the players and images from their respective cameras are continued to be recorded. Note that the headsets of each player may also exchange its identification information with other headsets, so that the identity of each headset generating images can be known and associated with the images it generates.

Proceeding to block 306, loop closure is affected by combining the features and descriptors of the area provided by each device from the various cameras into an aggregate SLAM map as discussed further below. This loop closure may be affected by a compositing processor such as in a server that receives images of feature points generated in blocks 302 and 304. If it determined at decision diamond 308 that a blind spot exists in the aggregated SLAM map from block 306, the logic may move to block 310 to alter a computer game being played by one or more of the players or to otherwise instruct one of the players to turn in such a way that his camera is pointed toward the blind spot indicated by the slam map. For example, if the logic determines that no objects are present in the aggregated SLAM map behind a particular player, it may infer that the space behind that player has not yet been imaged and thus is a blind spot. That player or another player may be instructed, e.g., through altering game presentation on the player's headset, to turn toward the area forming the blind spot and thereby cause the respective camera to image the blind spot.

Figure 4:
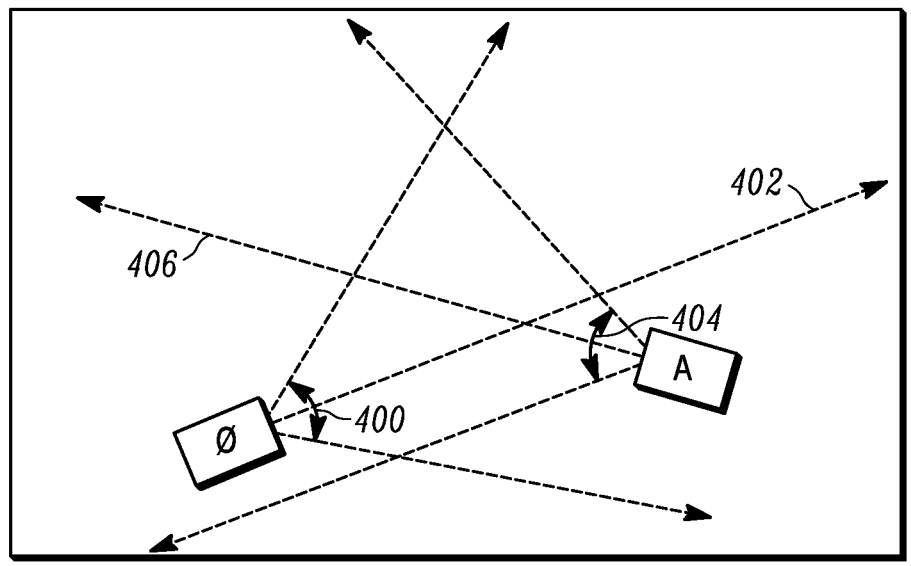
FIG. 4 is a schematic top view of two devices showing field of view of the players.

FIG. 4 shows that a first player headset, designated herein "headset 0", may have a camera providing a field of view (FOV) with a FOV angle 400. The first headset "0" may have a FOV axis 402. The camera may be implemented by a complementary metal oxide semiconductor (CMOS) camera to produce still or video images for purposes of generating a SLAM map.

Likewise, a second headset "A" may have a camera providing a field of view (FOV) with a FOV angle 404 with a FOV axis 406. More than two headsets may be used. In the example shown, each camera, e.g., on a respective VR/AR headset, is within the FOV of the other camera, e.g., on a respective VR/AR headset, and the FOVs of the cameras overlap as shown. The cameras, e.g., on respective VR/AR headsets 0, A establish an optical micro-mesh.

Figure 5:
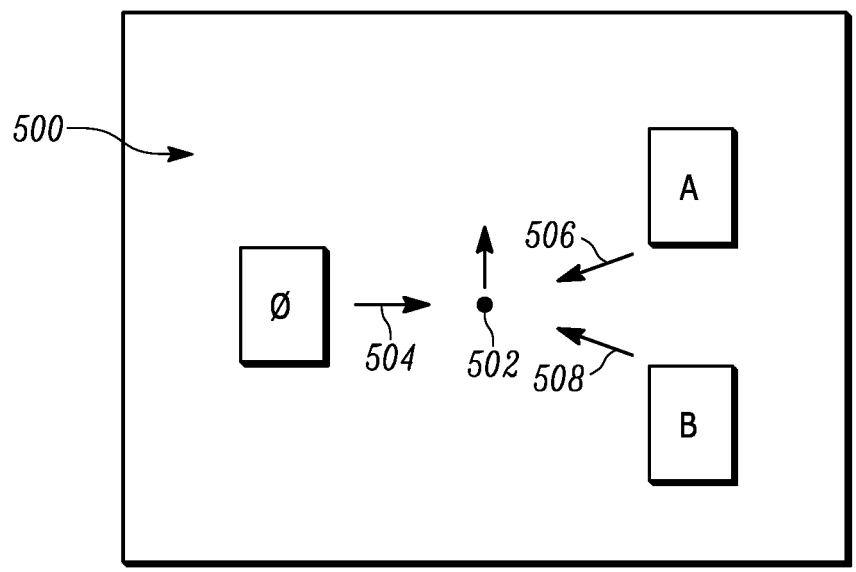
FIG. 5 is a schematic top view of three devices.

FIG. 5 illustrates a system 500 with three cameras, e.g., on respective VR/AR headsets 0, A, B implemented by any of the devices described herein. As divulged further below, each device (such as a headset with camera) generates its own information useful for constructing a SLAM map by imaging feature points including other devices within its field of view (it is to be understood that in other embodiments a server or coordinating device may receive image streams from each device and generate the SLAM map itself). The feature points (such as features and descriptors of the area from all devices) are aggregated together for a reference location that may be user-defined. In the example shown, the disclosure below assumes a reference location 502 located centrally in the system 500. Other reference locations may be modeled, including using one of the players wearing one of the headsets 0, A, B as a reference location. For description purposes, assume that the arrows 504, 506, 508 respectively represent the centerline axis of the field of view of each camera 0, A, B.

Figure 6:
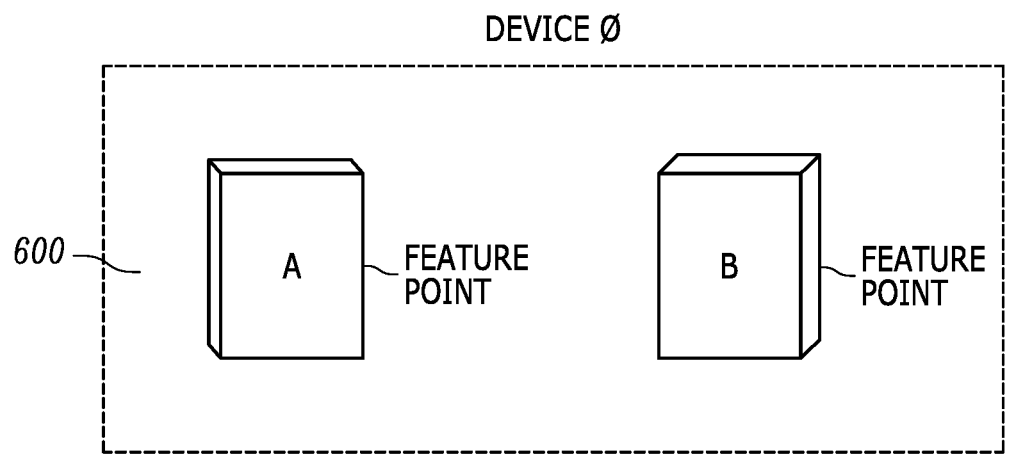
FIG. 6 schematically shows a SLAM map as generated by a first device in FIG. 5.
Figure 7:
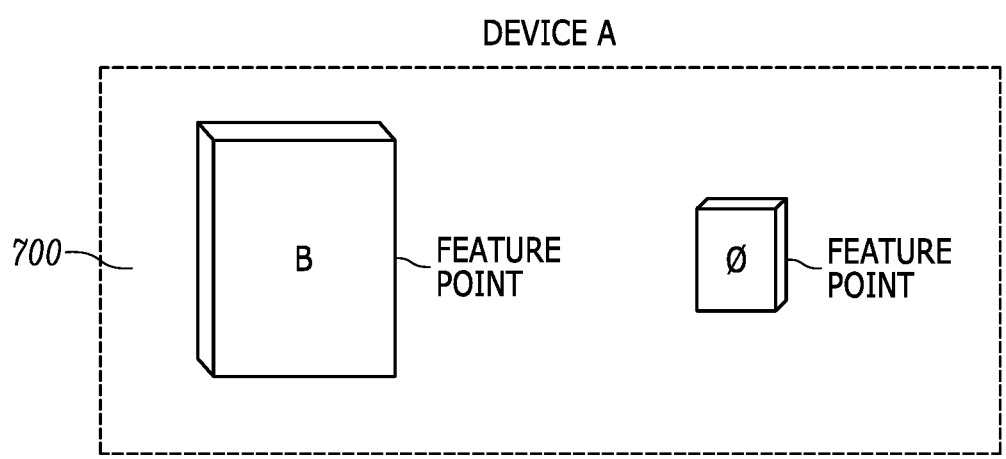
FIG. 7 schematically shows a SLAM map as generated by a second device in FIG. 5.
Figure 8:
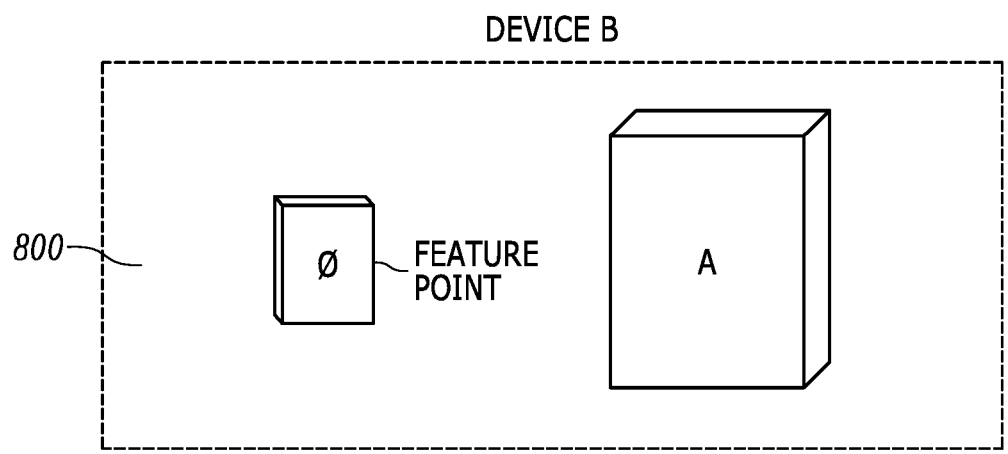
FIG. 8 schematically shows a SLAM map as generated by a third device in FIG. 5.

With the above description of FIG. 5 in mind, FIGS. 6-8 respectively show features and descriptors 600, 700, 800 generated by each camera device 0, A, B of the other devices in its FOV. Some of the feature points, in the example shown, images of other devices, are larger than others because the device corresponding to the larger image is closer to the imaging device than the device corresponding to the smaller image. The information can be 3D information as shown, and the relative locations of the devices are known to the other devices according to further description below. Thus, each device generates feature points and their relative locations with respect to the imaging device, which knows the direction its respective centerline axis is in and thus the angular offset of each feature point from that centerline axis. The absolute locations of the devices may be determined if desired using, e.g., the absolute location of any one of the devices using, for instance, its GPS location.

Distance to each feature point may be determined by correlating the size of its image to distance. For example, since the size of each player can generally be known as, e.g., a six-foot-tall adult, and preprogrammed into each of the devices, a reference image size, e.g., height, can be correlated with a reference distance. Linear interpolation can be used to then associate smaller feature point sizes than the reference size with greater distances than the reference distance and larger feature point sizes than the reference size with lesser distances than the reference distance.

Figure 9:
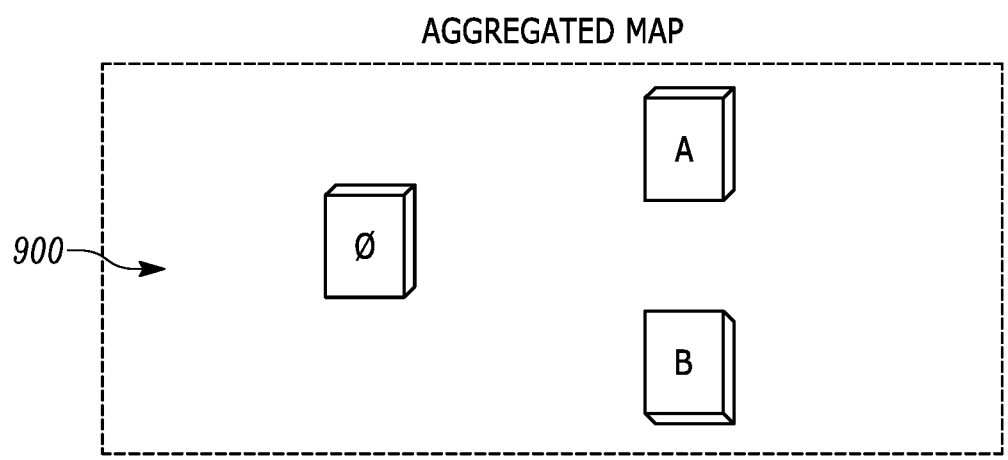
FIG. 9 schematically shows an aggregate SLAM map generated using the SLAM maps of FIGS. 6-8.

The SLAM map information 600, 700, 800 is aggregated into a single aggregate SLAM map 900 of FIG. 9 that is referenced to the reference location 502 in FIG. 5. The aspects of each feature point in the aggregate SLAM map 900 are altered as appropriate for the angle and distance each device is from the reference location 502. This may be done because each of the three-feature point/devices in the example shown is present in two of the three images that are used to construct the SLAM map and presents a different aspect to each imaging device. One or more of the processors described herein can execute a graphics engine to access the multiple aspects of each imaged feature point and present a single image of the feature point with the aspect it would present when viewed from the reference point 502, as shown in the aggregated SLAM map 900 of FIG. 9.

Figure 10:
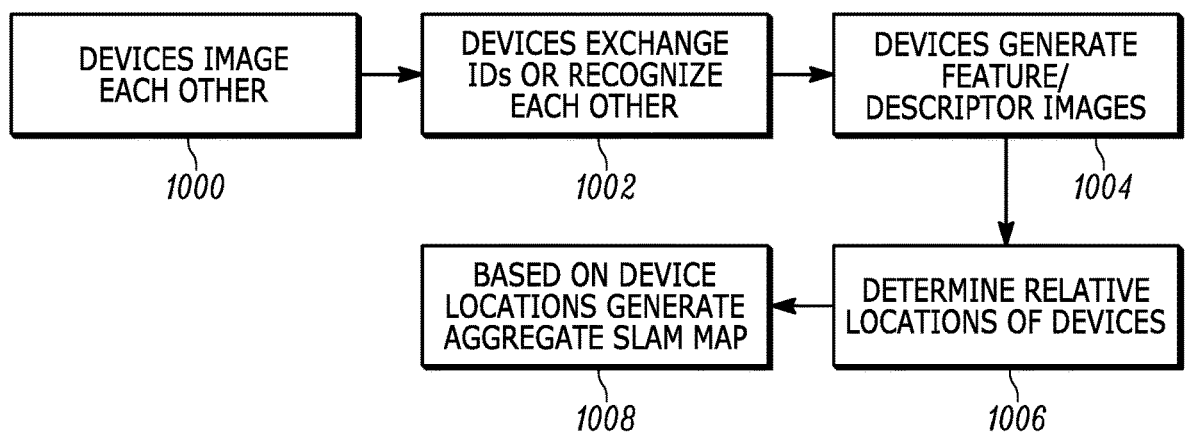
FIG. 10 is a flow chart of example logic for generating an aggregated SLAM map.

FIG. 10 illustrates further. Commencing at block 1000, the cameras 0, A, and B (e.g., on respective player headsets) image each other as well as other real-world objects in their FOVs. At block 1002 the headsets may exchange identifications or otherwise recognize each other using image recognition, so that each device can know, e.g., the size of the other devices (based on ID) and the relative locations of the devices relative to the imaging device. This information may be sent to the compositing processor. Additionally, if desired one or more feature points in the field of view of each camera can be used to help stitch the images together by referencing specific/common points and colors of the feature point. In other words, the compositing processor can receive information such as image information or image recognition information derived from executing image recognition algorithms on feature points to determine one or more non-CE device objects (such as, e.g., a pen, a projector, a chair, etc.). The compositing processor may then compare the received information from other devices to identify common feature points between images and in this way use commonly recognized objects as reference points in generating the SLAM map.

At block 1004 the SLAM map information 600-800 is generated by the compositing processor. The locations of the devices are determined at block 1006 using example principles above and based on the device locations and the reference location for the aggregated SLAM map, the aggregated SLAM map 900 is generated as described above.

In another embodiment, synthetic 3D SLAM mapping may be executed using the principles above, except that instead of using multiple cameras, a single camera is used to generate a 3D image in a first location, then moved to other locations to generate additional 3D images of the same object, with the various images being stitched together.

Figure 11:
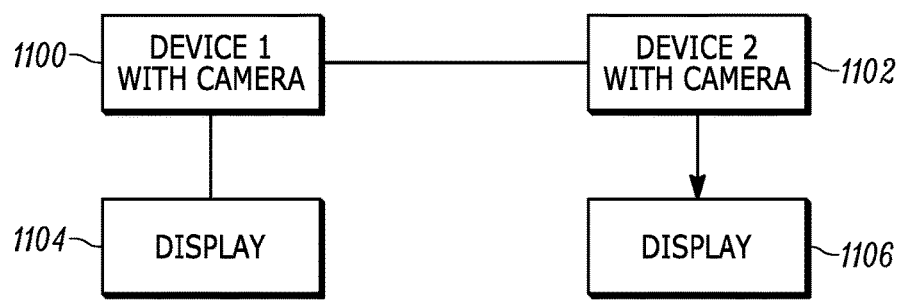
FIGS. 11-13 are block diagrams of example SLAM map generation system architecture.
Figure 12:
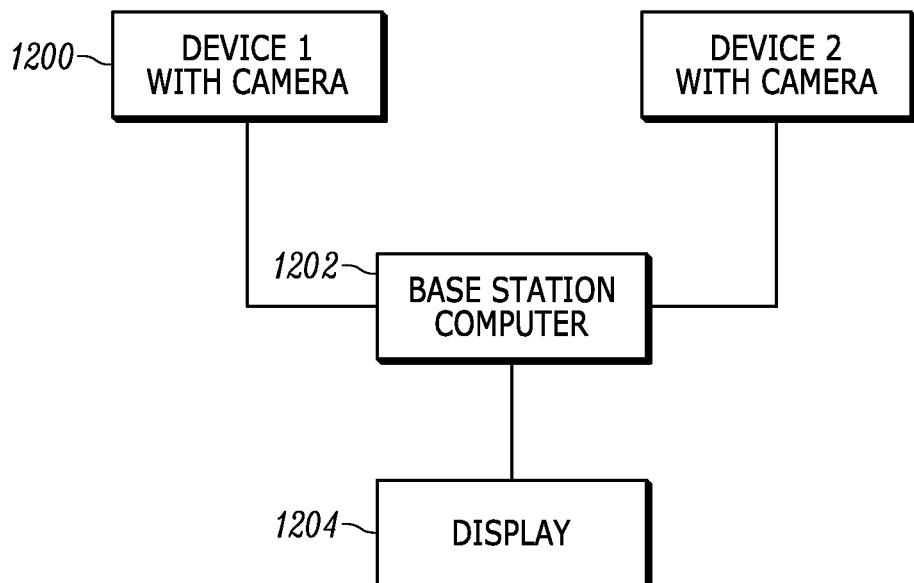
Figure 13:
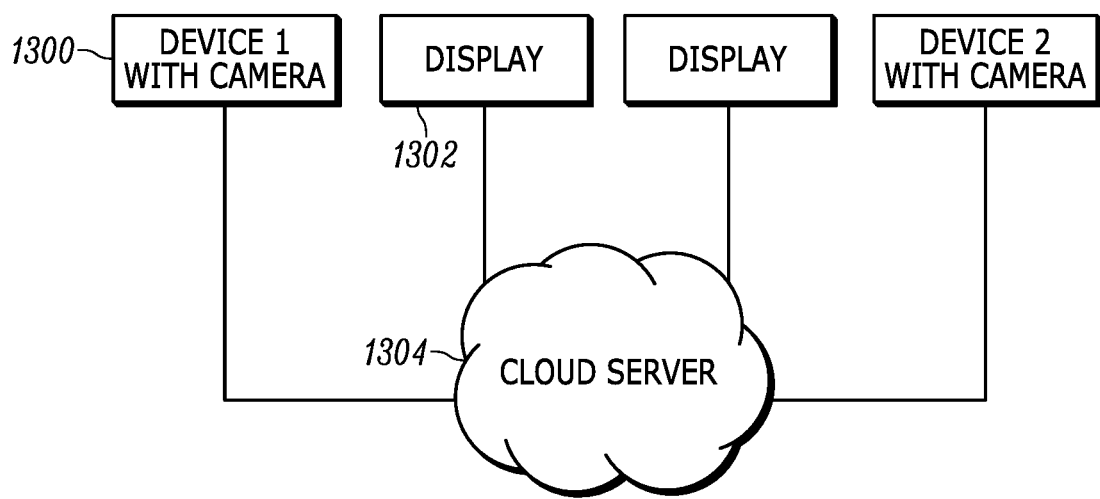

FIG. 11 illustrates a peer-to-peer (P2P) architecture in which each camera-bearing device 1100, 1102 (such as a VR/AR headset) receives the area features and descriptors information from each of the other devices 1102, 1100 in the space to generate a composite SLAM map and output it on a respective display 1104, 1106. On the other hand, FIG. 12 shows a base station-implemented architecture in which each camera-bearing device 1200 (such as a VR/AR headset) outputs its feature point information to a base station computer 1202, such as a computer game console or other device, which generates a composite SLAM map and outputs it on a display 1204 such as the AVD 12 shown in FIG. 1. Yet again, FIG. 13 shows a cloud architecture in which each camera-bearing device 1300 (such as a VR/AR headset) outputs its feature point information to a cloud server 1304, which generates a composite SLAM map and outputs it on one or more displays 1302 such as the video display of each headset or the AVD 12 shown in FIG. 1.

Figure 14:
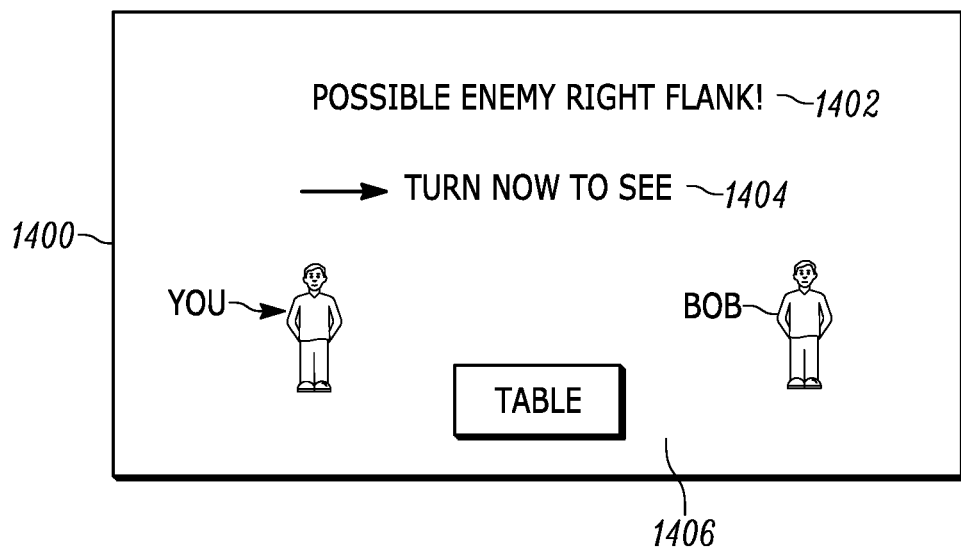
FIG. 14 is a screen shot of an example user interface that can be presented on a VR/AR headset to prompt a player to turn toward a blind spot in an existing SLAM map to image objects in the blind spot.

FIG. 14 illustrates principles discussed above in reference to FIG. 3 to image a blind spot in the composite SLAM map that may have been identified as such on the basis of no feature points appearing in the area encompassed by the blind spot. A display 1400 such as a display associated with any of the headsets described herein may be used to present a message 1402 in the context of a computer game being played or in a setup mode that causes the wearer of the headset to turn in the direction of the blind spot, so as to cause the camera on the headset to image the blind spot. An explicit video and/or audible and/or haptic message 1404 to this effect may be presented. In the example, it is assumed that the blind spot is to the right of the player being messaged. Hence, a text message or visual graphics that leads the player to look right may be used, and/or 3D audio may also be used to present audio to the player as if coming from the right of the player to lead the player to look right for the apparent source of the audio. A vibration generated on a right part of the frame of the headset may also be used to lead the player to look right.

A composite SLAM map 1406 may also be presented on the display 1400 consistent with principles above. In the example shown, the location of the wearer of the headset is shown, as is another player named "Bob" and a real-world table in the room, the latter to help the wearer avoid stumbling into the table.

Thus, by leading the player/wearer of the headset to turn in the direction of the blind spot through computer game, even if the wearer's camera is the only camera that has imaged the object for SLAM, other people's headsets/systems may then still be apprised of objects discovered in the blind spot via the composite SLAM map that incorporates the newly-discovered object(s).

In addition to the above, to know that the same feature point is being imaged from different perspectives, one or more devices herein disclosed may transmit sound toward the feature point and detect echoes from the feature point, thereby localizing it. Or, another player may be imaged recording the object, so that the feature point in the other player's generated image is thus known. A feature point may immediately be identified when a player enters an already-mapped room.

Infrared (IR) signals also may be employed, with each feature point potentially generating its own IR signature. For example, a first device may direct IR light toward a feature point, e.g., after recognizing the feature point. A second device may then image the same feature point and acknowledge/recognize it as the same object for use in SLAM map generation and aggregation based on the detected IR light. This may be based on communication with the first device to know that IR light is being bounced off a certain feature point and based on itself detecting the IR light/signature off the feature point to thus identify the feature point with the IR light as shown in the image(s) from the second device as being the same feature point from the first device.

As discussed above, players can be tracked. Warnings may be generated if a player is about to bump into an object/feature point or another player as might occur, e.g., during a VR experience that uses a SLAM representation of a room and that is shared by two users in the room.

The above principles of loop closure by means of compositing SLAM map information reduces error in the SLAM mapping. Filters also may be used to compensate for error. For the initial player localization described above, each player may be instructed to turn a full 360-degree circle to image the space. Visual geometry, GPS, and motion sensors such as gyroscopes and accelerometers also may be used.

Digital exhibits outside of strictly computer gaming may also implement present principles, such as a digital museum exhibit. Likewise, drones and robots, not just headsets, may implement the components discussed above. Remote cloud computing can be employed to perform loop closure, and for cameras with different aspect ratios a processor can be used to normalize the images and transform them into a shared aspect ratio.

While particular techniques and machines are herein shown and described in detail, it is to be understood that the subject matter which is encompassed by the present invention is limited only by the claims.

What is claimed is:

1. A storage device comprising:
   at least one computer medium that is not a transitory signal and that comprises instructions executable by at least one processor to:
   receive, from a first device, at least first feature points in a point cloud;
   receive, from a second device, at least second feature points in a point cloud;
   generate a simultaneous localization and mapping (SLAM) map using the first and second feature points; and
   determine a distance to a first feature point at least in part based on a size of the first feature point.

2. The storage device of claim 1, wherein the instructions are executable to:
   exchange device identifying information with the second device.

3. The storage device of claim 1, wherein the first feature points comprise at least portions of an image of the second device.

4. The storage device of claim 1, wherein the instructions are executable to:
   receive from at least a third device third feature points; and
   generate the SLAM map using the third feature points.

5. A storage device comprising:
   at least one computer medium that is not a transitory signal and that comprises instructions executable by at least one processor to:
   receive, from a first device, at least first feature points in a point cloud;
   receive, from a second device, at least second feature points in a point cloud; and
   generate a simultaneous localization and mapping (SLAM) map using the first and second feature points; and
   responsive to determining that the SLAM map has a blind spot, alter presentation of a computer game on at least one of the first and second devices.

6. The storage device of claim 1, wherein the first and second devices are implemented as computer game headsets.

7. An assembly comprising:
   at least first and second computer game headsets, each comprising at least one respective camera;
   a processor programmed with instructions to:
   generate, using the respective camera of the first computer game headset, at least a first image of feature points in a point cloud;
   receive from at least the second computer game headset, at least a second image of feature points in a point cloud;
   generate a SLAM map using the first and second images; and
   determine a distance to a computer game headset corresponding to feature points in the first image least in part based on a size of the feature points.

8. The assembly of claim 7, wherein the instructions are executable to:
   exchange device identifying information with the second device.

9. The assembly of claim 7, wherein the feature points from the second device includes an image of the first computer game headset taken by the second computer game headset.

10. The assembly of claim 7, wherein the instructions are executable to:
receive from at least a third computer game headset information including an image of feature points in a point cloud; and
generate the SLAM map using the third information.

11. An assembly comprising:
at least first and second computer game headsets, each comprising at least one respective camera;
a processor programmed with instructions to:
generate, using the respective camera of the first computer game headset, at least a first image of feature points in a point cloud;
receive from at least the second computer game headset, at least a second image of feature points in a point cloud;
generate a SLAM map using the first and second images; and
responsive to determining that the SLAM map has a blind spot, alter presentation of a computer game on at least one of the first and second computer game headsets.

12. The assembly of claim 11, wherein the presentation is altered at least in part by prompting a turn toward the blind spot.

13. A method comprising:
receiving, from a first device, at least first feature points in a point cloud;
receiving, from a second device, at least second feature points in a point cloud;
generating a simultaneous localization and mapping (SLAM) map using the first and second feature points; and
determining a distance to a first feature point at least in part based on a size of the first feature point.

14. The method of claim 13, comprising:
exchanging device identifying information with the second device.

15. The method of claim 13, wherein the first feature points comprise at least portions of an image of the second device.

16. The method of claim 13, comprising:
receiving from at least a third device third feature points; and
generating the SLAM map using the third feature points.

17. A method comprising:
receiving, from a first device, at least first feature points in a point cloud;
receiving, from a second device, at least second feature points in a point cloud;
generating a simultaneous localization and mapping (SLAM) map using the first and second feature points; and
responsive to determining that the SLAM map has a blind spot, altering presentation of a computer game on at least one of the first and second devices.

18. The storage device of claim 5, wherein the instructions are executable to:
exchange device identifying information with the second device.

19. The storage device of claim 5, wherein the first feature points comprise at least portions of an image of the second device.

20. The storage device of claim 5, wherein the instructions are executable to:
receive from at least a third device third feature points; and
generate the SLAM map using the third feature points.

21. The storage device of claim 5, wherein the first and second devices are implemented as computer game headsets.

22. The assembly of claim 11, wherein the instructions are executable to:
exchange device identifying information with the second device.

23. The assembly of claim 11, wherein the feature points from the second device includes an image of the first computer game headset taken by the second computer game headset.

24. The assembly of claim 11, wherein the instructions are executable to:
receive from at least a third computer game headset information including an image of feature points in a point cloud; and
generate the SLAM map using the third information.

25. The method of claim 17, comprising:
exchanging device identifying information with the second device.

26. The method of claim 17, wherein the first feature points comprise at least portions of an image of the second device.

27. The method of claim 17, comprising:
receiving from at least a third device third feature points; and
generating the SLAM map using the third feature points.

28. The method of claim 17, comprising:
determining a distance to a first feature point at least in part based on a size of the first feature point.

29. The assembly of claim 11, wherein the instructions are executable to:
determine a distance to a computer game headset corresponding to feature points in the first image least in part based on a size of the feature points.

30. The storage device of claim 5, wherein the instructions are executable to:
determine a distance to a first feature point at least in part based on a size of the first feature point.

* * * * *